United States Patent
Du

(10) Patent No.: US 10,950,020 B2
(45) Date of Patent: Mar. 16, 2021

(54) REAL-TIME AR CONTENT MANAGEMENT AND INTELLIGENT DATA ANALYSIS SYSTEM

(71) Applicant: INTEGEM, INC., Cupertino, CA (US)

(72) Inventor: Eliza Y. Du, Cupertino, CA (US)

(*) Notice: Subject to any disclaimer, the term of this patent is extended or adjusted under 35 U.S.C. 154(b) by 0 days.

(21) Appl. No.: 15/973,509

(22) Filed: May 7, 2018

(65) Prior Publication Data

US 2018/0322674 A1 Nov. 8, 2018

Related U.S. Application Data

(60) Provisional application No. 62/502,646, filed on May 6, 2017.

(51) Int. Cl.
| | | |
|---|---|---|
| *G06T 19/00* | (2011.01) | |
| *G06T 11/60* | (2006.01) | |
| *G06K 9/62* | (2006.01) | |
| *G06F 21/62* | (2013.01) | |
| *G06F 16/432* | (2019.01) | |
| *G06F 21/10* | (2013.01) | |

(52) U.S. Cl.
CPC .......... *G06T 11/60* (2013.01); *G06F 16/434* (2019.01); *G06F 21/10* (2013.01); *G06F 21/6218* (2013.01); *G06K 9/6267* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 7,053,915 | B1* | 5/2006 | Jung | G10H 1/368 345/629 |
| 8,624,962 | B2* | 1/2014 | Lopes | G06T 19/00 348/50 |
| 2010/0060662 | A1* | 3/2010 | Law | A63F 13/10 345/629 |
| 2010/0257252 | A1* | 10/2010 | Dougherty | G06T 19/006 709/217 |
| 2012/0135784 | A1* | 5/2012 | Lee | G06K 9/00624 455/556.1 |

(Continued)

OTHER PUBLICATIONS

Harrison et al., "Pseudo-3D Video Conferencing with a Generic Webcam," Dec. 2008, IEEE, pp. 236-241 (Year: 2008).*

*Primary Examiner* — Andrew G Yang

(57) ABSTRACT

Described is a real-time content management and data analytics system for AR-based platforms. The data management system described herein manages AR content and user interactions with the AR content. Additionally, a new multiple-stage information augmentation design based on real-time data analysis and live AR interaction is described. In this design, AR content design is very flexible and may be organized into one or more stages containing pre-defined content, on-line searched content, user generated content, other user generated content, real-time user interactively generated content, or some combination. The flexibility content structure brings allows for a high customizable AR experience for each user to maximize user relevance and stickiness. An example application of the system described herein is for interactive advertisements.

20 Claims, 5 Drawing Sheets

(56) References Cited

U.S. PATENT DOCUMENTS

| | | | | |
|---|---|---|---|---|
| 2012/0236105 | A1* | 9/2012 | Alberth | H04N 7/147 |
| | | | | 348/14.07 |
| 2013/0083007 | A1* | 4/2013 | Geisner | G02B 27/017 |
| | | | | 345/419 |
| 2013/0229406 | A1* | 9/2013 | Elyada | G06F 1/1694 |
| | | | | 345/419 |
| 2013/0304587 | A1* | 11/2013 | Ralston | G06Q 30/0271 |
| | | | | 705/14.67 |
| 2013/0317912 | A1* | 11/2013 | Bittner | G06T 19/006 |
| | | | | 705/14.64 |
| 2013/0342564 | A1* | 12/2013 | Kinnebrew | G09G 3/003 |
| | | | | 345/619 |
| 2014/0178029 | A1* | 6/2014 | Raheman | G06T 19/006 |
| | | | | 386/224 |
| 2014/0225978 | A1* | 8/2014 | Saban | G09F 19/16 |
| | | | | 348/14.07 |
| 2015/0040074 | A1* | 2/2015 | Hofmann | G06T 19/006 |
| | | | | 715/852 |
| 2015/0091942 | A1* | 4/2015 | Ko | G06T 19/006 |
| | | | | 345/633 |
| 2017/0039770 | A1* | 2/2017 | Lanier | G06T 19/006 |
| 2017/0236329 | A1* | 8/2017 | Harvey | H04N 21/812 |
| | | | | 709/204 |
| 2018/0122142 | A1* | 5/2018 | Egeler | G06F 16/5854 |
| 2018/0190003 | A1* | 7/2018 | Upadhyay | G06T 15/005 |
| 2018/0315243 | A1* | 11/2018 | Mahler | G06F 3/017 |
| 2019/0130650 | A1* | 5/2019 | Liu | A63B 24/0006 |

* cited by examiner

REAL-TIME AR CONTENT MANAGEMENT AND INTELLIGENT DATA ANALYSIS SYSTEM

CROSS REFERENCE TO RELATED APPLICATIONS

The application claims priority to U.S. Provisional Patent Application No. 62/502,646 filed on May 6, 2017 entitled "Real-time AR Content Management and Intelligent Data Analysis System".

FIELD OF INVENTION

The present invention is related to the field of augmented reality. More particularly, it concerns systems, devices, and methods for managing AR content and conducting data analytics on AR content and user activity within an AR platform. Additionally, the invention concerns data structures for AR content. Specifically the invention provides a new data structure that renders an AR environment from one or more stages of AR content.

BACKGROUND

Mixed reality (MR) is the merging of real and virtual worlds to produce new environments and visualizations where physical and digital objects co-exist and interact in real time. MR combines augmented reality (AR) techniques with virtual reality (VR) method to deliver an immersive experience. The goal of MR is to provide a rich, real-time interactive experience for the user that allows them to feel as if they were in a place that is different from their actual physical location. Applications of MR are widespread and diverse, but each is based on the underlying concept of receiving real world sensory input, for example, sound, video, graphics, haptics, or location data and adding further digital insights to that information.

Recent technological advancements and social changes have brought MR/AR/VR technology into the mainstream. Powerful mobile computing devices, such as smart phones, tablet computers, laptops, and navigation devices provide the necessary hardware to support more advanced applications for processing real word sensory input. Additionally, widespread use and adoption of specialized computer applications and artificial intelligence has generated significant consumer and professional interest in using AR platforms to provide a more realistic simulation of a real world experience. This abundance of computing devices and growing interest from business and the public has spawned a perfect storm for the development and adoption of MR/AR/VR platforms.

Holographic MR is an emerging type of MR experience. Holographic MR environments display fully three-dimensional objects within an AR environment. Until recently, these complex systems where impossible to provide at scale because of computational resource limitations. A continued rise in performance of computer memory and graphical processing speed in accordance with Moore's Law, however, is bringing scalable holographic MR systems within the realm of possibility. Despite much excitement about- and development on-holographic MR systems most of the infrastructure necessary to realize scalable MR has not been completed. Accordingly, there exists a well-established need for content management systems that efficiently provide AR content to a holographic MR environment.

Despite the technological potential of advanced MR/AR systems most AR environments render digital objects within a real environment. These systems allow users to picture impossible, expensive, or hard to find virtual objects in an a familiar environment, for example, the home, school, walk to work, or other common scenes from everyday life. In other words most AR systems bring the virtual world into the immediately accessible real world environment. Currently, there is no possibility for actual real life objects, including people, pets, and personal possessions to travel to- and interact with- a virtual world. Accordingly, there exists a well-established need for an content management system that manages MR/AR/VR content in a way that provides live user interaction with a virtual environment. Similarly, there exists a well-established need for a content structure that can be easily managed within a content management system to provide real life images and live user interactions within a virtual environment. The user interactions should be fully dynamic and the content structure should be flexible enough to allow different user interactions with the same MR/AR/VR environment. Additionally, there exists a well-established need for a content management system that incorporates a real time data analytics module that can modify or update and AR environment according to user preferences or analytics data. Moreover, there exists a well-established need for an AR content structure that can be efficiently managed to incorporate real life images and live user interactions as well as real time data analytics information. The content structure should allow some parts of the AR content to be modified without effecting the remaining portions. The transitions between items of AR content or portions of the same AR content should also be independently modifiable.

SUMMARY

The present invention is related to systems, devices, and methods for augmented reality (AR) environments. More particularly, the invention relates to content management systems for managing content within an MR/AR/VR platform. Content managed by the content management system includes AR content, for example AR source content, AR user content, AR combined content as well as non AR content, for example, images, video, audio, and analytics information. The content management system manages multiple kinds of AR content during the AR process to provide relevant and real-time responsive and interactive AR content to the user. Additionally, the AR content management system incorporates data from third party services, for example, business intelligence providers and social medial networks, to manage advertisement bidding and immersion as well as social media sharing and responses in real time.

Artificial intelligence and computer vision are deployed in AR content management system described herein as well as data analytics and live user interactions. In one example, the content management and data analytics system also enables an offline AR system to immerse AR content into online social media networks and other real-time Internet applications. Another embodiment of the invention enables immersion of social media information and other real-time online information into an off-line AR system.

The invention also describes a new way to structure and manage AR content. In this example, the AR content may be divided into one or more stages. Each stage of an AR source content item can be independently modified irrespective of the other stages of the AR source content or other item of AR content that are incorporated into an AR environment. One embodiment of the content management system described herein updates one or more stages of the AR source content in real time by incorporating user AR content including real life images and live user interactions with the AR source content. The content management system provides this user AR content to an AR machine so that the images and interactions performed by the use can be incorporated into the AR environment in real time. In this way, the content management system allows live user interactions with virtual 2D/3D holograms. In one example of this live interaction feature, a virtual 2D/3D hologram is generated in a item of AR source content. A user interacts with the 2D/3D hologram by talking, moving, looking, or otherwise modifying behavior in relation or response to the 2D/3D hologram. The user interacted creates user generated AR content. The content management system stores and provides the user generated to an AR machine in real time as the interaction is occurring. The live interaction is then simultaneously incorporated into the AR environment by the AR machine to provide a real time interactive experience between the user and the 2D/3D hologram.

User generated content is unique for each user therefore the content structure needs to be flexible to allow for different user interactions with the same content. The AR content of the invention described herein is structured to have one or more stages. The stages are independent of other stages in the same AR content item and other AR content items. To deliver a live user interaction with a 2D/3D hologram, user generated content containing the unique user interaction is augmented into the stage of AR source content containing the 2D/3D hologram at a particular orientation and position that received the user interaction. The user interaction is added to this particular stage in real time to provide a live interactive experience between the user and the AR environment. In one example, the content management system manages the AR source content to restrict access to AR source content by users. Access restrictions preserve the AR source content in its original state to allow other users to have their own unique interactions with the AR source content. The content management system stores AR user content independently from the AR source content so that users will always have access to their source content. Any time the user wants to replay the interaction with the 2D/3D hologram the content management system will provide the AR user data containing the interaction and the AR source data containing the 2D/3D hologram and the AR environment to a AR machine for display. In one example, the content management system associates the AR user data with a particular stage of AR source content so that the 2D/3D hologram will be in the correct orientation and position to receive the user interaction.

In another example, the content management system provides content for a live user interaction with the AR environment. In this example, the AR device detects the image of a user and updates the AR environment with the user image. Movements by the user detected by the AR machine will appear in real time in the AR environment due to the operation of the content management system. Both user AR data including the live image of the user and AR source content data contain the virtual environment contain the user's picture are stored in a content database managed by the content management system. To provide a live image of the user in the virtual environment, the content management system provides the stage of AR source content corresponding to the AR user content, the user image portion of the AR user content is also provided by the content management system. The AR machine then renders the stage of AR source content and the AR user content image in real time to display a live image of the user in the AR environment.

In one example, the content management system receives raw data and AR source content from an AR machine, checks the authorities dependencies associated with the data, for example, permissions, access restrictions, offline or offline availability that can include permissions and or offline/online availability) and sends the data to other machines for AR source content to combine with the data managed by the content management system.

Data provided by the content management system is sent to an AR machine so that users can use the AR source content. When users interact with the AR source content they generate AR user content. The AR user content may be incorporated into other AR content and saved as user generated AR source content or AR combined content that is saved in a content database managed by the content management system. The AR user content may also be stored in an uncombined form as AR user content managed by the user. Accordingly, the content management system of the present invention may include an AR source content management system that is not accessible externally by regular users and an AR user content management system that is publicly accessible by regular AR users. The AR user content management system allows users to view and share their own AR user content with other users so that the other users may incorporated the AR user content into their own AR environments.

AR combined content and user generated AR source content is managed through AR source content management system and the AR user content management system. User authorization for AR combined content and user generated AR source content is more permissive than AR source content because regular users can access the AR combined content and user generated AR content they created.

The content management system for managing AR user content is further configured to manage AR user content for holographic AR. AR user content in holographic AR systems always includes user images and interaction with 2D/3D holograms displayed in the AR environment. The content management system comprised herein provides special memory for storing AR user content in short term storage so that it can be quickly accessible by AR machines displaying the AR user content in and AR environment. New AR source content interactions contained in the AR user content generate AR combined content and displayed as a live interaction between the user and the holographic 2D/3D image. The content management system described herein further prevents the AR source content from being modified while also providing the AR source content augmented with AR user content to an AR machine in real time. This capability allows users to have different and unique interactions with the same AR source content.

Unique user interactions with AR source content generate a third category of AR content, AR combined content which provides a user-designer co-creation experience. Users interacting with AR source content in unique ways generate new AR source content along with their own AR user content. The AR machine and content management system described herein combine to deliver a combined AR creation and AR experience on the AR platform described herein. They dynamic, independently modifiable content structure allows for the combined AR creation and AR experience by allowing unique user interactions with AR source content to be upgraded into existing AR source content in real time to deliver an AR environment with users can have live interactions with virtual objects displayed in AR environments.

The AR user content generation further enjoys the benefit of flexibility of updating one or more stages of AR source content independently from other stages of source content to that the unique user interaction may be incorporated into the stage it occurs in without terminating, restarting or otherwise interrupting the other stages of the AR source content. Accordingly, if an user or admin performs or restricts a unique AR interaction in the middle of a AR content stage, the existing generated AR user content is still saved and can be processed, replayed and shared without permanent or temporary interruption.

Data analysis results are managed in a different way. Data analysis results that are releasable to users, for example, a user's own profile analytics results and own connected device analytics results, have AR user content authorization. Data analysis results that are not releasable to users, for example business data analytics results or anonymized aggregated user profile analytics results or connected device analytics results, are access restricted and require higher level authorization, for example, admin authorization, AR source content authorization or corporate client authorization In this example, the AR source content is structured with stages. Each stage can be independent from other stages. Therefore the stages can be updated in real-time. Here stage is dynamic, flexible, and interchangeable. Accordingly the AR source content is structured like a series of movie scenes not rigid steps. The structure of the AR content is uniquely flexible therefore the content management system described herein requires additional complexity to efficiently management the unique content structure.

In one aspect, disclosed herein is a content management system for providing real-time augmented reality (AR) data to one or more AR machines. The AR machines receive a continous stream of raw data including visual data, and optionally one or more of audio data, sensor data, or a some combination. The some portion of raw data is then sent to the content management system and data analtytics service. The data analytics service extracts user, device, or business insights from the raw data and geneates analytics results information that is sent to the content mangement system. The content management system users the analytics results information to select and provide content to the AR machine.

In this example, the analytics results information may contain at least one of a user preference, a system setting, an integration parameter, a characteristic of an object or a scene of the raw data, an interactive user control, or some combination. The content management system and the data analytics service operate in real time to modify one or more stages of AR source content based on the analytics results information, for example, the content management system by provide less detailed AR source content or strip away some objects contained the AR source content based on connected device analytics result information the indicates the connected device struggling the maintain the computational performance necessary to fully render the AR environment in real time.

In one example, analytics results information related to one stage of AR source content is extracted in real-time from the raw data or a variant thereof at one or more time points based on analytics results information extracted on a previous or concurrent stage of the same item of AR source content.

In another example, the analytics results information is learned based on aggregated analytics results information extracted from multiple time points. In this example the data analytics service may deploy one or more artificial intelligence systems or machine learning models to learn analytics results information. This machine intelligence may be deployed as a machine learning or artificial intelligence model that can be used to anticipate analytics results information, thereby improving the efficiency of the content management process and reducing the amount of computational resources needed to generated a live interacted experience with an AR environment. The analytics results information described herein may include many information types including text, one or more codes, one or more numbers, one or more matrixes, one or more images, one or more audio signals, one or more sensor signals, one more machine readable data types or some combination.

In some embodiments, the content management system combines raw data and at least one of one more stages of AR source content or AR user content according to one or more data analytics results. The combined information is then sent to an AR machine for display.

In some embodiments, the content management system removes unwanted data from the raw data, variant thereof, one or more stages of AR source content or AR user content, the unwanted data comprising unwanted environment scene data, data that are determined to be irrelevant based on one or more criteria comprising a user preference, a system setting, a characteristic of an object or scene from the raw data, selected data from which information has been extracted, selected information from which knowledge has been learned, or some combination.

In some embodiments, the at least one set of data analytics information is of a different type from the data parameters in the raw data that correspond to the information input or the knowledge input.

In some embodiments, the data analytics information is extracted from the raw data or AR content using big data techniques, for example data streams, data frames, distribute storage, distributed processing and database sharding.

In some embodiments, the data analytics service learns relevant data based on information extracted at multiple time points based on one or more criteria, for example, a user preference, a system setting, a characteristic of an object or scene from the raw data, an integration parameter, an interactive user control, at least one criterion based on big data, or some combination.

In some embodiments, the content management system provides compression portions of real-time data to AR machines.

In some embodiments, the raw data received by the content management system from a third party computer device or Internet application.

In some embodiments, the method or operation comprises: receiving, in real-time at the computer device, existing AR-data from the other computer device, the existing AR-data comprising existing information data and existing knowledge data.

In some embodiments, the raw data received by the content management system is generated by a data input and output component local to the AR machine generating the raw data. The local data input and output component may include a microphone, a camera, a display, a sensor, or some combination.

In some embodiments, the camera comprises a 2D camera, a 2D/3D camera, a 4D camera, a color camera, a near infrared camera, an infrared camera, a thermal camera, a multi-spectra camera, a hyperspectral camera, or some combination.

It would be understood that any embodiments disclosed herein can be applied, when applicable, in any aspect of the invention, alone or in any combination. Details of one or more implementations are set forth in the accompanying drawings and the description below. Other features, aspects, and potential advantages will be apparent from the description and drawings, and from the claims.

DETAILED DESCRIPTION

As used herein, the term "AR source content" means any AR content item comprising audio, video, sensor data, interactive control information, or some combination. As used herein, the term "AR user content" means any AR source content user interaction data describing how one or more users interacts with AR source content. AR user content may include metadata or any other publicly or privately accessible user interaction content or other user generated content. As used herein, the term "AR combined content" includes user generated content that includes a novel interaction with AR source content. AR combined content may include elements of AR user content and AR source content that includes and may be packaged as content metadata or another form of AR content.

Figure 1:
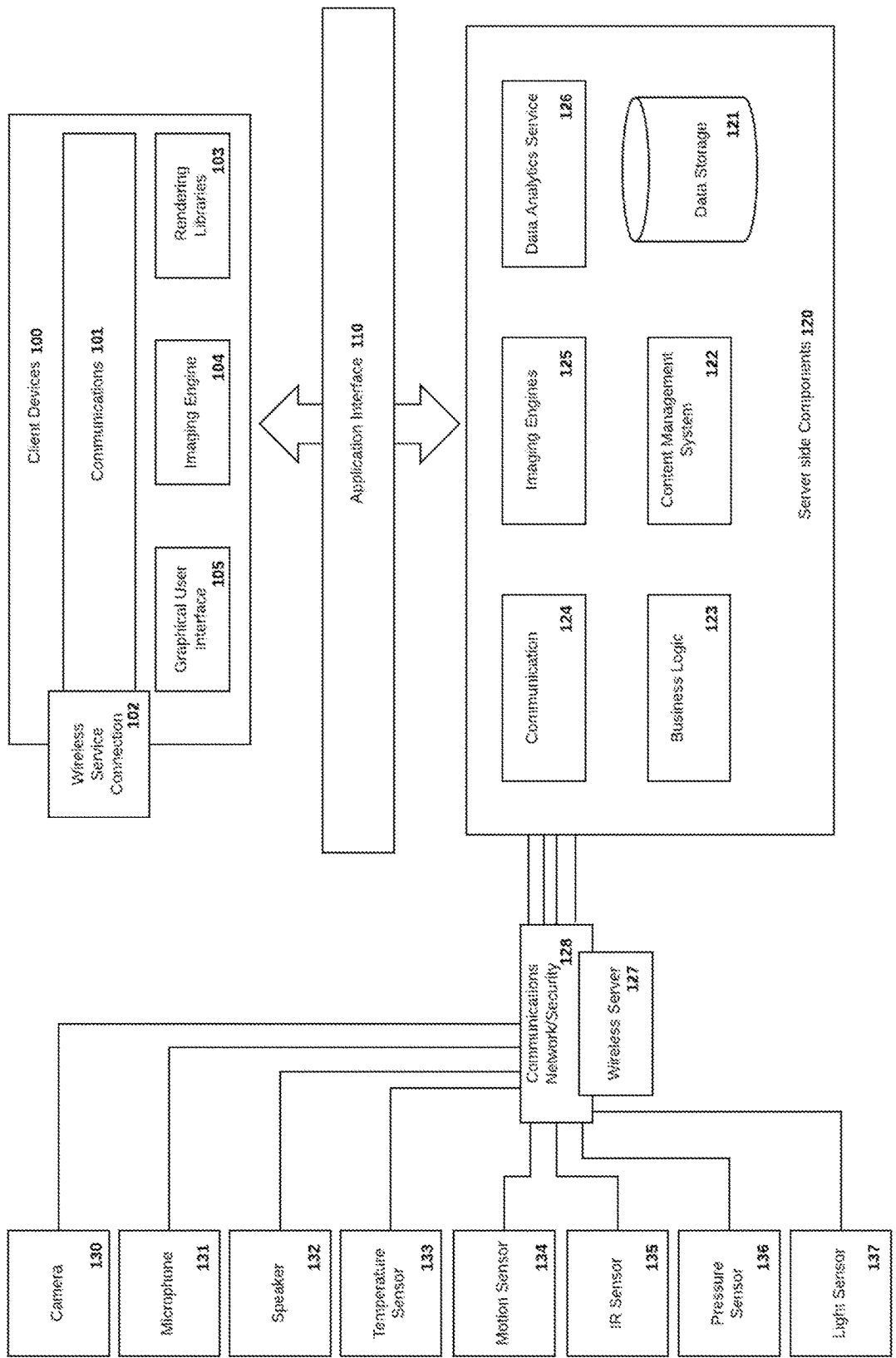
FIG. 1 illustrates a client-server environment of an AR platform for generating live interactive AR environments.

FIG. 1 illustrates a client server arrangement for providing a holographic AR environment. The client server arrangement may also provide for live user interaction with an AR environment, for example, what a 2D/3D hologram rendered in the AR environment. The arrangement includes one or more client side components 100 that interact with one or more server side components 120 using an application interface 110, for example an application programing interface (API) written in a programing language, for example, PIIP, Python, Java, Node, or JavaScript.

The client side components 100 are implemented in a web based or mobile application programmed to run on a plurality of computing devices for example, a desktop computer, laptop, tablet, mobile phone, or smart phone. The client side components include a communications module 101 that provides a wireless service connection 102 for interfacing with the server side components 120, one or more internal components, third party services, or computer systems, for example, 130-137, or other applications connected to the Internet. Information received from the wireless 102 service connection is provided to the graphical user interface (GUI) 105 for display and further processing. The imaging engine 104 generates 2D/3D models, simulations, and AR environments that provide interactive AR experiences and live user interactions with 2D/3D holograms. The imaging engine 104 interfaces with one or more rendering libraries 103 to compile, arrange, and/or buffer one or more objects generated by the imaging engine 104 into a static or dynamic AR environment that provides for live user interaction. In one example, the dynamic AR environment is an intergalactic travel experience that depicts users traveling to different planets in the solar system including Mars, Earth, Jupiter, and Venus. The intergalactic travel experience may also include scenes from other elements of the universe, for example stars, black holes, and moons. Another example includes a transitional AR environment that transitions between a stage of an intergalactic travel scene and an advertising aspect from a sponsor. One or more objects provided by the imagine engine 104 may also be processed by one or more rendering libraries 103 to generate an augmented reality environment. The rendering libraries 103 may interface with the GUI 105 to present an augmented reality environment as an interactive model of a Blue Whale hologram and a live user image transposed in an underwater AR environment that supports live user interactions with the Blue Whale hologram. In one example, the user interacts with the GUI 105 to angle, rotate, or otherwise manipulated the hologram by moving a hand or other body part in the direction of the hologram. The augmented reality environment provided by the GUI 105 tracks changes in body position and automatically adjusts the user image and the 2D/3D hologram to reflect the changes. Accordingly, the augment reality environment provides a realistic live user interaction with 2D/3D holograms rendered in an AR environment across a full range of rotational motion, spatial arrangements, position alignments. Multiple cameras may be used to render 2D/3D holograms of virtual objects and or extract images of real people into virtual reality environments to provide live user interactions with AR environments.

The components 120 included in the server system may be configured to run on one or more servers, virtual machines, or cloud compute instances. The server side components 120 include a communications module 124 that provides a connection to a wireless service 127 as well as a network connection and/or security layer 128 connection for authenticating access to a network for interfacing with the client side components 100, the application interface 110, one or more internal components, third party services or computer systems, for example, 130-137, or other applications connected to the internet. The server system further includes a content management system 122 managing documents, graphic content, artificial intelligence models, 2D/3D models, simulations, and augmented reality environments and other content produced or processed by the server side components 120. Data storage 121 provides physical storage, memory, and backups for data managed by the content management system 122 and generated or processed by one or more server side components 120. One or more imaging engines 125 generate one or more 2D/3D models, simulations, or augmented reality environments from data provided by the content management system 122. In this example, the content management system may provide many different types of data, for example, user generated content, user AR interactive content, pre-designed AR content, real-time content, overlay information, voice and music information, sponsor information, for example, advertising aspects or offers, advertisement bidding information, social media information, data privacy configurations, and data access control settings.

The data analytics service 126 may provide analytics information that determines the content provided by the content management system 122. Analytics information provided by the data analytics service 126 may also influence the stages of AR content or content elements integrated into AR source content by the imaging engines 125. After receiving content from the content management system 122, the imaging engines 125 may add, remove, or update one or more content elements within a stage of AR source content or multiple AR source content stages based on analytics results data and other instructions received from the analytics service 126. Once the content elements or stages of AR source content are updated, rendering libraries within the imaging engines 125 interfaces with the imaging logic contained in the imaging engines 125 to provide one or more 2D/3D models, simulations, or augmented reality environments to the application interface 110 for processing and display on one or more client side applications running a plurality of client devices.

The server system further includes business logic 123 for performing the day-to-day business tasks of the server and client systems. Tasks performed by the business logic include data analytics, accounting and payment processing, as well as chat and messaging.

One or more third party services, computer systems, or other applications connected to the Internet may provide data to- or otherwise interface with- at least one of the client side components 100 or the server side components 120. Example internal system components and third party services include sensors 133-137 and component input and output devices 130-132. Example sensors include a temperature sensor 133 for determining user body temperature or the air temperature of the real life environment surrounding a user and a motion sensor 134 for tracking physical movements of the user including changes in body position, facial expression, as well as gaze direction and duration. The motion sensor 134 may track movements of an individual user and well as the movements of several people if the user is in a busy area or part of a crowd. Other sensors provided in this example include a IR sensor 135 for sensing infrared wavelength light to measure connected device performance and interaction data as well as perform image analysis, a pressure sensor 135 for measuring air pressure and sound intensity, and a light sensor 137 for measuring light intensity to perform image analysis and determine the current time of day of a user. The data analytics service 126 can make automated inferences from processing raw sensor data, for example time of day, current environment weather, user information, connected device data, aggregate crowd information, business information, user environment information, or some combination.

Input and output devices that included in the system described herein may include a camera 130 for capturing live user images and video, a microphone 131 for capturing audio input data such as user speech or music as well as speech and music from the environment surrounding a user, and a speaker 132 for providing audio data, for example, speech or music to a user or an AR environment. The input and output devices capture user interaction information necessary to provide live user interactions with AR environments. Information received from the input and output devices can be processed by the data analytics service 126, stored and selectively provided by the content management system 122 and incorporated into one or more elements of a stage of AR source content or several AR stages by the imaging engines 125.

Input and output devices and sensors interface with the server side components with through wireless and wired communications, for example, Wifi, Bluetooth, cellular communication including LTE, 5G, 4G, 3G, etc., a local access network (LAN) or wide area network (WAN). A wireless server local to the server side components may also enable one or more input and output devices or sensors to interface with Internet based applications or realize some web-enabled functions, for example, remote access and control, communication with one or more online messaging services, or cloud based data storage and processing.

Figure 2:
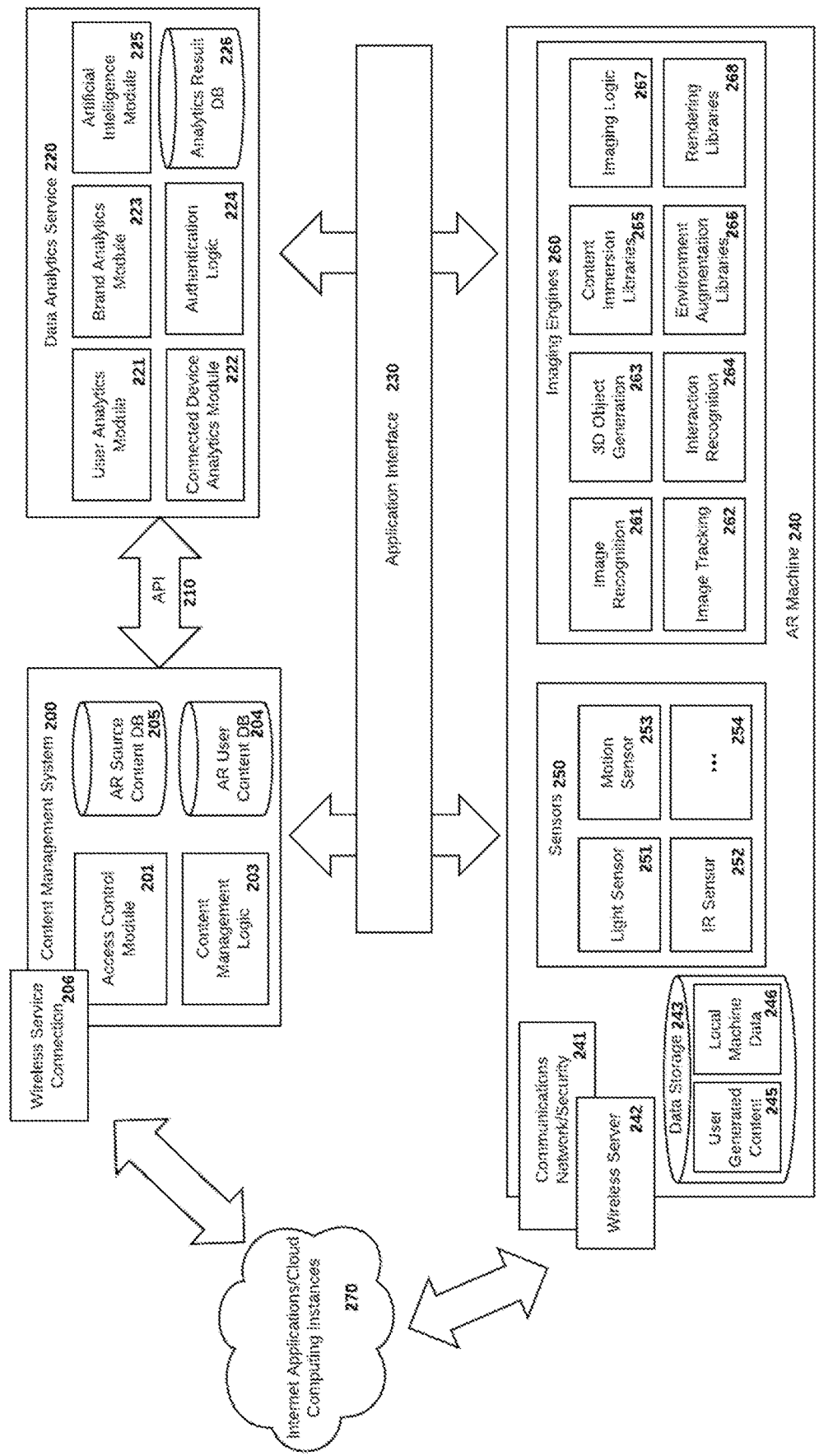
FIG. 2 illustrates a server system arrangement for managing AR content using real time data analytics.

FIG. 2 illustrates a server system for generating 2D/3D models, simulations, and augmented reality environments that provide live user interactions with hologram objects and AR environments. The server system includes a plurality of server side components including a content management system 200, a data analytics service 220, an application interface 230, and an AR machine. A communications network/security module 241 provides hosts a wireless server 242 to provide a wireless connection for interfacing with cloud based virtual machine instances and applications connected to the Internet. The communications network/security module also provides a network connection for interfacing with third party services, computer systems, or other applications through wired connections. The communications network/security module 241 also provides security features including network security and platform authentication to prevent regular users from accessing AR source content, local machine data 246, business analytics information and other limited access platform data stored in the data storage module 243 on an AR machine 240 or the analytics result database 226 inside the data analytics service 220. Platform authentication services provided by the communications network/security module 241 also provide users access to user generated content 245 created by the user and other user information such as user profile information, user preferences, user image data, and user interactions with digital objects and AR environments.

The communications network/security module 210 interfaces with the imaging engines 260, data analytics service 220, and content management system 220 to provide secure data received from one or more Internet applications/cloud computing instances 270 that interact with the sever system, for example, social media applications, Internet search applications, third party APIs with a web endpoint, cloud storage instances, or cloud compute virtual machine instances. The content management system 200 interfaces with the Internet applications/cloud computing instances 270 via a wireless service connection 206. Using the wireless service connection 206, the content management system may incorporate real time online content and other content from Internet applications or cloud computing virtual machine instances into the AR source content database 205. The wireless service connection 206 interfaces with the access control module 201 to restrict public access to the AR source content database 205 and grant public user access to AR user content items created by the use that are stored in the AR user content database 204.

The content management system 200 also includes content management logic 203 for selecting one or more content elements, content items, or stages of a content item from the AR source content database 205. The content management logic 203 may also select one or more elements of AR user content or AR user content items, for example, a user image or user interactive data, from the AR user content database 204. Selected AR source content and AR source content items are sent to the imagining engines 260 inside an AR machine 240. The imaging logic 267 then updates the AR source content with the content provided by the content management system 200 and the rendering libraries 268 read the AR source content and render AR environment and virtual objects as instructed by the AR source content.

In one example, the access control module interfaces with the AR source content database 205 to prevent regular users from accessing the AR source content items stored in the content database 205. By restricting access to the AR source content 205 the access control module 201 ensures the many users will be able to interact with the same AR source content without altering or corrupting the experience of other users. The access control module 201 allows admins and other users with higher-level AR source content database permissions to add, remove, or modify AR source content items stored in the AR source content database 205.

The content management system 200 interfaces with the data analytics service 220 through an application programming interface (API) 210. The data analytics service 220 ingests raw data from one or more sensors 250 and input output devices, for example, a camera, microphone, or speaker and AR content from the data storage module 243. One or more analytics modules 221-223 and 225 then process the data to generate analytics results information. In one example, the user analytics module 221 generates user analytics information, for example, user identification information, user engagement data, or user interaction information from processing one or more of user AR content, image data from a camera, and motion sensor data. In another example, the connected device analytics module 222 generates connected device analytics information, for example connected device identification, connected device interaction information, and connected device performance information, from processing one or more of device interaction information, AR source content display information, or AR user content. The brand analytics module 223 generates business analytics information, for example user advertising aspect engagement, aggregate crowd advertising aspect engagement, or advertising aspect conversion rate from processing user and aggregate crowd motion detection information, and connected device information such as user browser history or user purchase history.

The Data analytics service may also contain a artificial intelligence module 225 for learning data analytics information from user, user environment, connected device and brand training data collected over time. By learning analytics information and distilling these learned insights into one or more artificial intelligence models or machine learning algorithms the artificial intelligence module 225 may predict analytics results for a new user or connected device with fewer processing steps and computational resources than other means of data analysis.

Analytics results information generated by the data analytics service 220 is stored in an analytics results database 225. The authentication logic 224 restricts access to the analytics results database 226 to prevent regular users from obtaining analytics results on other users or connected devices. Accordingly, the authentication logic 224 will restrict access to the analytics results database to admins or users with higher-level authorization, for example, business accounts or corporate clients conducting brand analytics on an advertisement campaign run on the AR platform.

Analytics results information generated by the data analytics service 220 is provided to the content management system via and API 210. The analytics results information indicates content that may be selected by the content management system 200 to provide to the AR machine 240. In one example, analytics results information indicates a user has a high engagement with advertising aspects that are red colored and contain cute dogs. Further analytics results information indicates the AR source content currently being rendered on the user's display device includes an advertising aspect that has a fast car overlaid on a blue background. To modify the advertisement aspect of the AR source content the AR content management system 200 selects AR source content having cute dogs and red color from the AR source content database 205. The content management logic 203 may also identify the stage of the AR source content and the elements of the stage advertising aspect that need to be modified. The AR content management system then sends the AR source content to the AR machine 240 along with the modification instructions. The imaging engines 260 then incorporate the AR source content form the content management system into the AR source content displayed on the user device in real time so that when the user reaches the stage of the AR source content containing the advertising aspect the imaging engines 260 will render the modified version of the AR source content containing the advertising aspect the user prefers.

An AR machine 240 interfaces with the content management system 200 and data analytics service 220. The AR machine includes one or more sensors 250 and input output devices for extracting live data from users and their surrounding environment. In one example the sensors 250 include a light sensor 251 for measuring light intensity and colors, and IR sensor 252 for measuring infrared wavelength light emitted by one or more user devices in the vicinity of the AR machine, and a motion sensor 253 for measuring changes in physical position and facial expression buy a user or crowd of users. One or more additional sensors 254, for example, a pressure sensor, a temperature sensor, or a biometrics sensor, may also be incorporated into the AR machine 240 to collect additional raw data about users and their surrounding environment. Raw data collected by the sensors 250 is sent from the AR machine 240 to the Data Analytics Service 220 for further processing to extract insights from the data. Additional platform data, for example, AR content data including the number, type and history of AR content played as well as performance data related to how a connected device performed with rendering and AR environment may also be provided to the data analytics service 220 by the AR machine 240. User interaction data, for example the number, type, and frequency of user interactions with particular AR environments and digital objects within AR environments may also provided to the data analytics service 220 by the AR machine 240.

The AR machine 240 further contains imaging engines for modifying, creating, and rendering AR content as a live interactive AR environment. The imaging engines include rendering libraries 268 that interfaces with the imaging logic 267 to provide one or more 2D/3D objects, models, holograms, simulations, animations, or augmented reality environments to an application interface. In one example, the rendering libraries 268 includes 2D/3D object rendering libraries for compiling 2D/3D objects generated by the 2D/3D modeling engine and AR rendering libraries for compiling AR environments generated by the AR engine. The rendering libraries 268 further include simulation streaming libraries for streaming 2D/3D object animations and user interactions provided by the animation engine over a content streaming network as well as image recognition logic 261 for matching the orientation of a live user image in an AR environment with the orientation of the user in real life. In one example the image recognition logic 261 recognizes a user from an their image and user movements in real life using recognition logic that is specific to the user and learned over time so that it becomes more precise the more times the user operates the platform software.

The imaging engines, 260, further include image tracking logic 262 having one or more libraries for tracking movement of the user in live streaming video and automatically adjusting the image of the user displayed in the AR environment to match changes in user physical position and facial expressions that occur in real life. AR content including 2D/3D objects, models, holograms, animations, simulations, and AR environments generated by the imaging engines 260 are managed by the content management system 200.

The imaging engines 260 also include 2D/3D object generation logic 263 for creating holograms that are displayed in holographic AR environments. The 2D/3D object generation logic 263 includes hologram imagining libraries that generate the physical appearance of the hologram object as well as hologram physics libraries for generating hologram movements that are similar to movements of real world objects having a similar size, shape, and physical mechanics. The 2D/3D object generation logic interfaces with the interaction recognition logic 264 to provide live interactions between users and holograms rendered in a AR environment. The interaction recognition logic 264 includes pre-designed libraries of user physical movements and facial expressions that produce responses from the 2D/3D hologram object rendered in the AR environment. In one example, having 2D/3D hologram spaceship the interaction recognition logic 264 is instructed to place the user image inside the spaceship with the user jumps in the air and turn the spaceship to the left if the user is already in the spaceship and raises their left arm.

In another example the interaction recognition logic 264 allows the user to generate their own unique interactions with 2D/3D hologram objects in real time. In this example, the interaction recognition logic 264 detects a new undersigned physical movement performed by a user. The interaction recognition logic 264 then communicates the new user interaction to the 2D/3D object generation logic 263. The 2D/3D object generation logic 263 then generates an appropriate response by the 2D/3D hologram object. The user interaction is saved as new AR user content and the 2D/3D hologram response is saved as new AR source content by the content management system 200. The content management system 200 sends the AR source content and AR user content to the content immersion libraries 265 that contain instructions for updating the AR source content currently rendered by the AR machine 240 with new AR content. The environment augmentation libraries then augment the new user interaction and 2D/3D hologram response into the AR environment currently displayed on the AR machine 240.

In this example the AR source content is divided into stages so elements of one stage can be updated quickly without affecting the other stages. This content structure allows the AR user content containing the new interaction and the AR source content containing the new 2D/3D hologram response to be incorporated by the content immersion libraries 265 into the AR source content currently being rendered on the AR machine in real time. Similarly, the flexible AR source content structure also allows the environment augmentation libraries to update the environment rendered on the AR machine in real time with the new user interaction and new 2D/3D hologram response. The real time AR content augmentation and new AR content immersion allows the content management system 200 described herein to provide a live user experience where the user can interact with one or more 2D/3D hologram objects in unique ways in real time within an AR environment.

Figure 3:
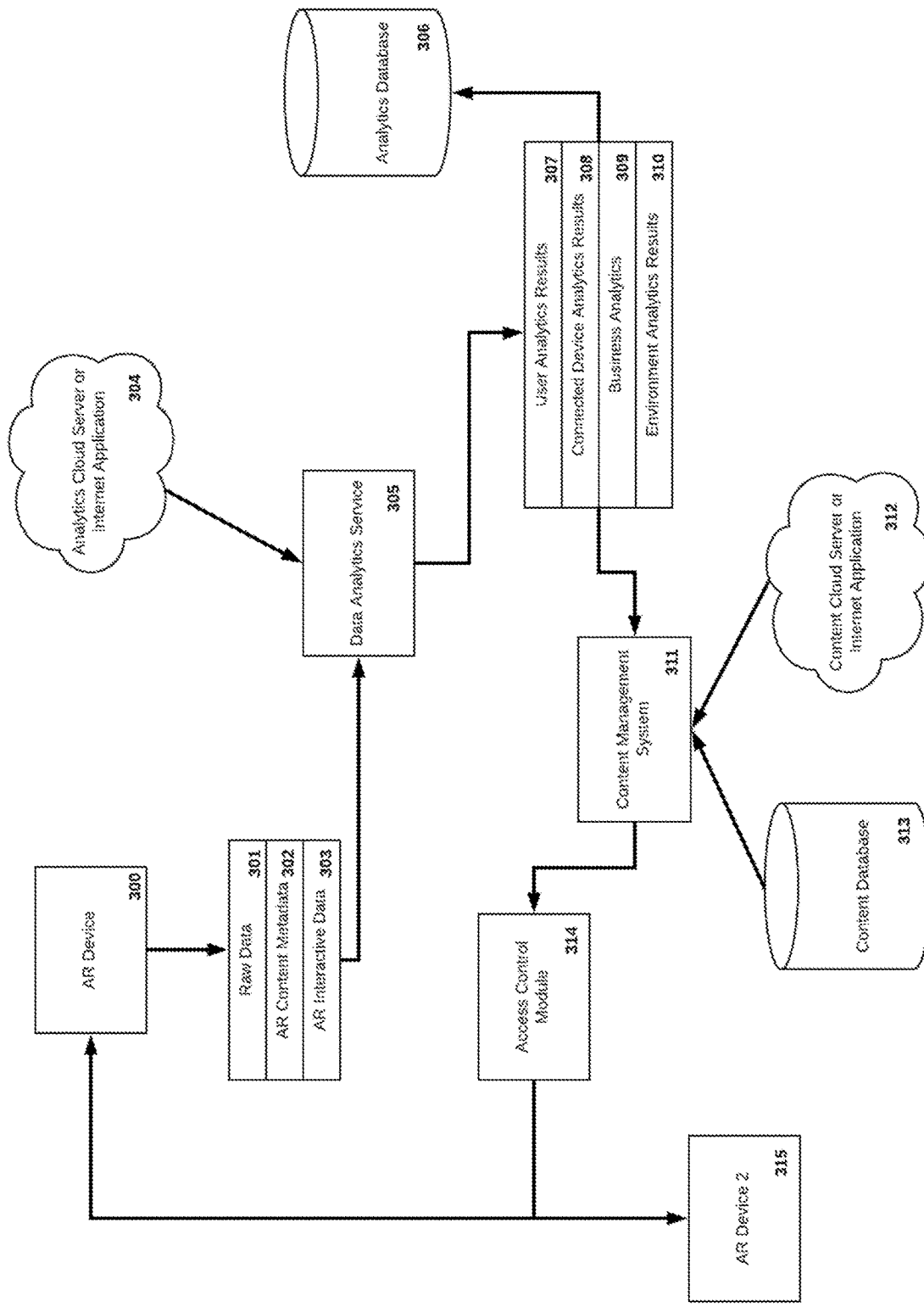
FIG. 3 displays an example process on a computer for managing content items using data analytics information and user access control settings.

FIG. 3 displays an example workflow for using an augmented reality system to provide a live interactive experience. In this example, An AR device 300 measures raw data 301 from sensors, for example, a motion sensor or light sensor and input and output devices, for example a camera or microphone. The AR device 300 further aggregates AR content metadata 302, for example number, of views or device performance information and AR interactive data 303, for example, user interaction data or user generated AR content. The raw data 301, AR content metadata 302, and AR interactive data 303 are sent from the AR device 300 to the data analytics service 305 for processing. The data analytics service 305 may also incorporate information from a third party service or Internet through a wireless connection with an analytics cloud server of internet application 304.

The data analytics service 305 processes at least one of raw data 301, AR content metadata 302, and AR interactive data 303 to generate analytics information. In this example, analytics information may include user analytics 307 results such as user identification information and user engagement or response metrics. Connected device analytics results 308 may include, for example, device performance metrics or device interaction metadata. Business analytics 309 may include advertisement aspect effectiveness metrics or aggregate user purchase history for a particular product or subset of products. Environment analytics results 310 may include aggregate user information such as crowd response metrics or pedestrian/person count measurements. Analytics information generated by the data analytics service 305 may be stored in an analytics database 306. An access control module may restrict access to the analytics database 306 to prevent regular users from accessing business analytics. Optionally, the data access control module may also restrict access to the analytics database to prevent corporate users from obtaining personal information, such as name, address, telephone number, IP address, device MAC address, or personal identification number, for example, social security number or state id/drivers license number. The analytics information may also be stored in memory, refactored as program instructions or otherwise set to the content management system 311.

In this example, the content management system 311 recieves the analytics information and uses it to select one more stages or elements of at least one content item stored in a content database 313. The content management system 311 may also provide content from a third party service or Internet application through a wireless connection with a content cloud server or Internet application 312. Additional information incorporated from the content cloud server of Internet application 312 may include social network information or content media as well as content media and information obtainable through an Internet based web search.

Content retrieved from the content database 313 or Internet by the content management system 311 is provided to the AR device 300, the AR device 2 315, a plurality of other AR devices, or some combination. Content provided by the content management system 311 is then incorporated into one or more stages of AR source content to provide a live user interactions with an AR environment, for example, live user interactions with a book, teacher hologram, or other students in a classroom virtual environment. A data access control module 314 may restrict access to the content database so that regular users cannot access AR source content and users can access AR user content, AR combined content, or AR user content created by them.

Figure 4:
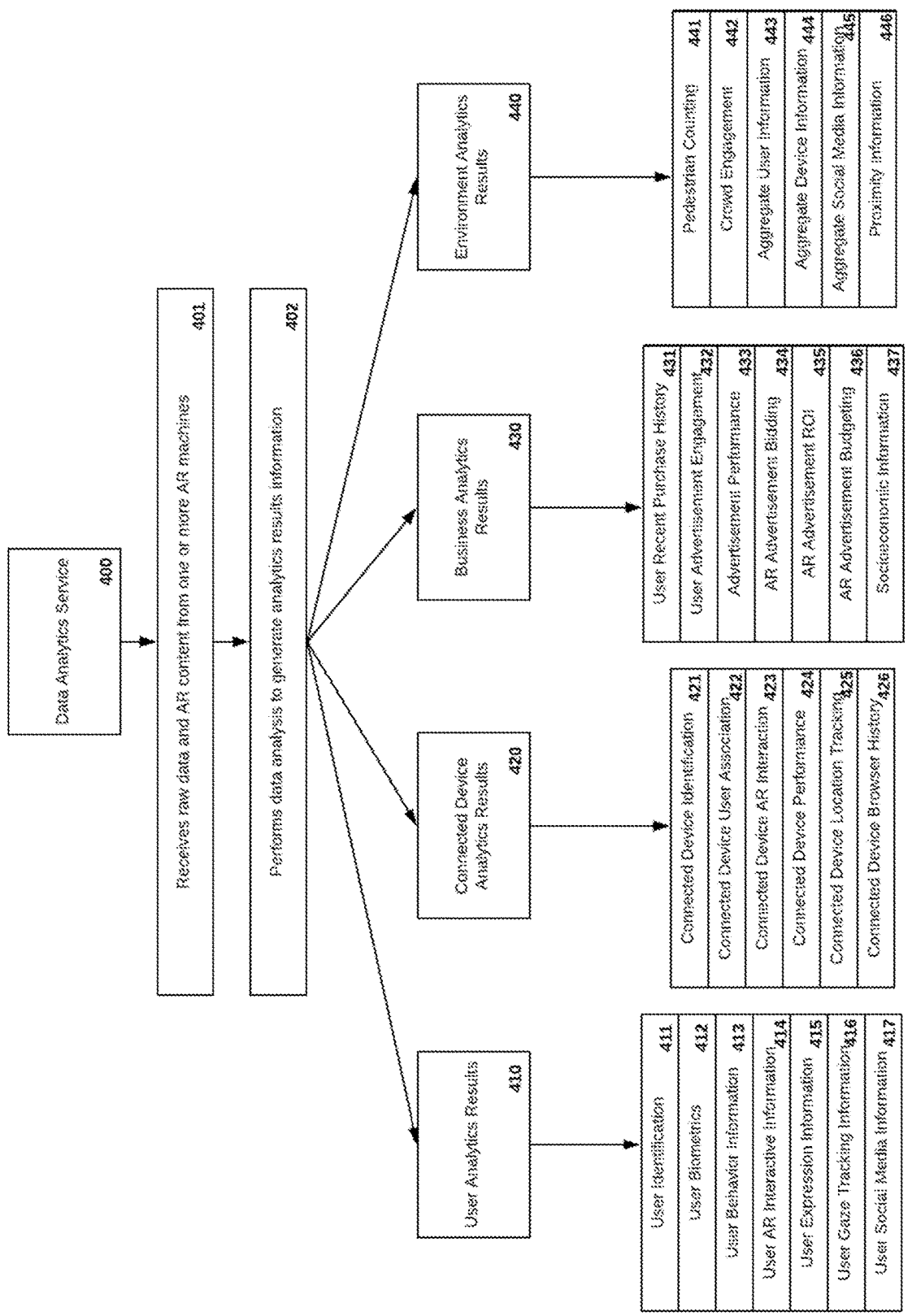
FIG. 4 illustrates an example process on a computer for performing different types of data analytics on raw data and AR content.

FIG. 4 illustrates an example process on a computer for performing different types of data analytics on raw data and AR content. In this example, the data analytics service 400 receives raw data and AR content 401. AR source content may comprise metadata and user interaction information for at least one of type of AR source content, AR user content, AR combined content, user generated AR content or some combination. The analytics service 400 then performs data analytics to generate analytics results information 402. In this example analytics results information includes user analytics results 410, connected device analytics results 420, business analytics results 430, and environment analytics results 440.

The user analytics results 410 may include user identification 411, user biometrics 412, user behavior information 413, user AR interactive information 414, user expression information 415, user gaze tracking information 416, user social media information, or some combination. Connected device analytics results 420 may include connected device identification 421, connected device user association 422, connected device AR interaction 423, connected device performance metrics 424, connected device location tracking 425, or connected device browser history 426. The business analytics results 430 may include user recent purchase history 431, user advertisement engagement 432, advertisement performance 433, AR advertisement bidding 434, AR advertisement return on investment 435, AR advertisement budgeting 436, user or location Socioeconomic information 437, or some combination. The environment analytics results may include data and metrics relating to aggregate crowds interacting with an AR environment, for example, pedestrian counting 441, crowd engagement 442, aggregate user information 443, aggregate device information 444, aggregate social media information 445, proximity information 446, or some combination.

Other example embodiments of the data analytics service are described herein. In one example, the content management system includes a data analytics service. The analytics service may process data provided to the content management system including data stored in the content database. The analytics service may also process information received from a third party Internet application, for example, a social media network, an internet search application, or a third party data provider having a data source that is accessible over an application programing interface (API) having an endpoint connected to the Internet, for example a virtual machine instance endpoint having a wireless or network Internet connection or an virtual machine instance connected to a wireless Internet server. The data analytics module may also process information from any internal datastore, for example, a content database, a local database on an AR machine, or a platform database on a server side system.

One function of the analytics module is to determine user and device information associated with content items handled by the content management system. Analytics results information generated by the analytics module are then used by the content management system to determine content items to provide back to an AR machine. In one example, the data analytics module processes one or more items of user generated content to identify the user who generated the content. In another example, the data analytics service processes AR user content to determine users response to an AR environment or an object displayed in an AR environment, for example, a 2D/3D holographic object. The analytics service may extract other user preferences or response information from sensor data collected by an AR device. In one example the analytics service determines user preferences for analyzing at least one of user expression information, user biometrics information, user AR interaction information, user gaze tracking, user dress and wearables information.

In one example, the data analytics service processes sensor information to determine user response to an advertising aspect of an AR environment. To determine user engagement with the advertising aspect the data analytics module extracts user identification information including demographics information, for example, gender, age, and ethnicity, form processing video or images received from the AR machine, Facial recognition, retina scans, or other biometrics information may also identify the user. As part of this process the biometric information may be automatically associated with a particular user profile or if no profile is associated with the biometric information a new user profile may be automatically created and associated with the biometric information. In addition to extracting user identification information, the data analytics module may further processes received video or images to determine use engagement with- and attention to- the advertising aspect by tracking user gaze direction and duration. The data analytics module further determines user sentiment towards the advertising aspect by analyzing user facial expressions to determine if the user reaction to the advertising aspect was positive, negative, or indifferent.

Analytics results from this example analysis may stored in the analytics module and protected by an access control module. The access control module restricts access to the analytics results information to prevent public access. In this example, access to the results information containing the user engagement, sentiment, and response to the advertising aspect is provided only to a business or corporation running the advertising aspect within the AR environment. The user identify portion of the analytics results information may be hashed or otherwise obfuscated to keep confidential the identity of the user pictured in the video or image processed by the data analytics service. After processing to generate analytics results information the video or images containing the user may also be deleted to further protect user privacy. Similar data processing techniques may be used to identify users and determine user engagement, sentiment, or response to A variety of AR environments, for example, an educational environment, a practical skills training environment, and business information environment, an entertainment environment, or a medical environment.

Analytics results information may also determine how to modify content items provided back to an AR machine. Modifications may include additions, changes, deletions, or some combination. Modifications also include new combinations of one or more stages of AR source content. AR source content, AR user content, AR combined content, and AR user generated content may also be incorporated into one or more stages of AR source content according to analytics results information generated by the analytics module. Analytics results information may be generated for any stage of AR source content and analytics results generated for one stage are independent of analytics results form other stages. Accordingly, one or more stages of the same AR source content item may generate different analytics results information when processed by the analytics module.

In addition to user data the data analytics service also processes extracts device information from devices connected to an AR machine or other AR system component. In one example, extracted device information includes connected device identification, connected device interaction information, and connected device performance information. By extracting several categories of information on devices connected to AR machines, the data analysis service provides insights into how performance of the AR machines can be optimized on one or more connected devices. The connected device analytics results information may also be used to provide additional information on user engagement and response to AR systems.

In one example, the data analytics system extracts connected device identification information and updates a device profile or if none exists creates a new device profile. The data analytics may then extract information from the connected device to gain more insights into user engagement and response to a particular AR environment, for example, the number of times the user replayed a piece of AR content on the connected device or the amount of time the user spent in each AR environment displayed on the connected device. Other information including the number of AR user content shared by the user or the websites the user browses after viewing or interacted with AR source content provide further information about the effect of the AR environment on the user. In one example, connected device information may be used to help advertisers track the effectiveness of an advertisement aspect embedded in an AR environment. In this example, the number of users who browsed for goods mentioned in the advertising aspect or related to the advertising aspect can be tracked using device information with high conversion rates between mentioning a particular product in an advertising aspect embedded in an AR environment and browser hits on sits selling the product mentioned is good evidence of a successful advertising campaign that should be continued or expanded. Alternatively, low conversion rates provide evidence that the advertising aspect was ineffective and should be discontinued or modified.

In another example, the data analytics service may use connected device performance analytics results to modify AR content provided to an AR machine. Connected device analytics results indicating the connected device lacks the computational performance to smoothly render the AR environment may cause the content management system to provide an incomplete or less vibrant version of the AR source content to the AR machine. Alternatively, connected device performance analytics results indicating the connected device is easily rendering an AR environment could cause the content management system to deliver a more complex or heavily augmented version of the AR source content to the AR device.

The flexible structure of the AR source content further increases the customizability of the AR environment provided by the content management system. In one example, the data analytics service generates user analytics results indicating a user has a high preference for mountain landscapes. The analytics service further indicates the connected device associated with the user has a very high computational performance capacity. The content management receives this information and provides AR source content to the user that contains several stages of the entertainment AR environment selected by the user with an stage containing a brief cut away to advertisement aspect stage containing the most vibrant mountain landscape in the content database and an advertisement for bottled water.

In this example, the data analytics service may also incorporate business intelligence information such as the highest bidder for a particular demographic of customer using the AR platform or the categories of product a particular user has browsed on the associated connected device in the last month. This business information can be updated in real time and incorporated into AR environments in real time by the content management system to allow maximum flexibility, personalization, and brand message enhancement. The data analytics service also ingests raw data from one or more sensors in an AR machine to extract user environment information, for example, pedestrian counting, people counting, geographic location, socio-economic status of a particular location, and local information including business and landmarks near the current location of the user. This additional information provides more ways to customize the AR content provided by the AR content management system.

Figure 5:
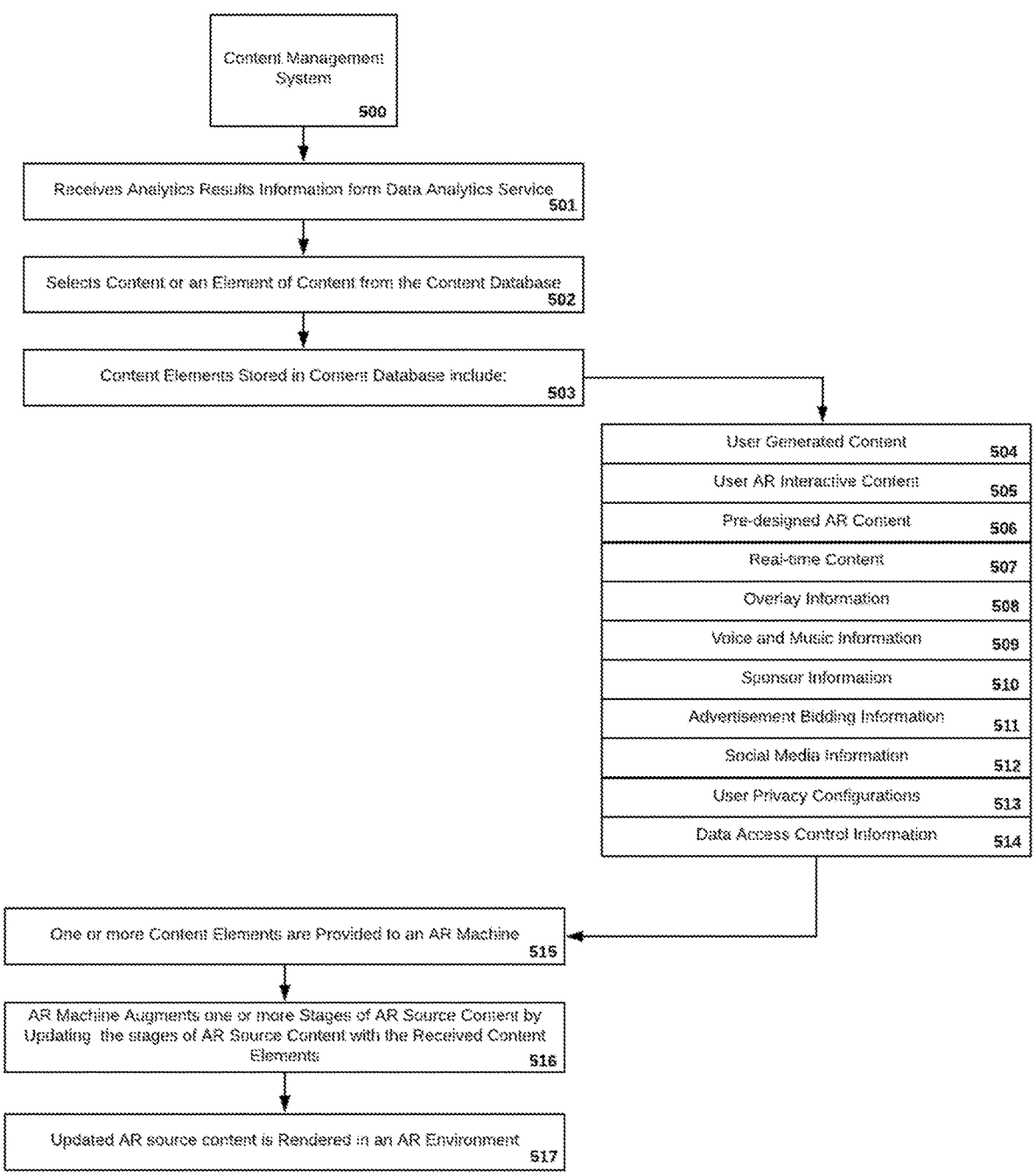
FIG. 5 displays an example process on a computer for managing one or more content elements using a content management system.

FIG. 5 describes a process for updating one or more stage or elements of a stage of AR content using the content management system described herein. In this example, the content management system 500 receives analytics results information form the data analytics service 501. The content management system 500 then selects content or an element of content from the content database 502 using the analytics results information. The content elements stored in the content database include, for example, user generated content 504, user AR interactive content 505, pre-designed AR content 506, real-time content 507, overlay information 508, voice and music information 509, sponsor information 510, advertisement bidding information 511, social media information 512, user privacy configurations 513, data access control information 514, or some combination. One or more of these content elements are selected from the content database and provided to an AR machine 515. The AR machine augments one or more stages of AR source content by updating the stages of AR source content with the received content elements 516. The updated AR source content is then rendered in an AR environment 517. The AR environment may be provided to users in real time to give a live interaction user experience, for example, a live interaction with a teacher, instructional material, fellow student, or other digital object generated in a classroom augmented reality environment.

We claim:

1. A method for managing content comprising:
   receiving augmented reality (AR) source content in a first content database, the AR source content having a plurality of stages, wherein a first stage in the AR source content comprises:
   user image processing info in this stage, comprising an integration instruction to incorporate the user(s) image into an AR user content in real-time in this stage, wherein the user(s) image is extracted in real-life in real-time, and
   at least one transition criterion from this stage to another stage based on a user's behavior detected from real-time user image;
   and
   a second stage in the AR source content comprises user advertisement engagement info;
   storing at least concurrent stage of AR source content;
   analyzing at least one content item in the AR source content to extract content selection criteria; and
   providing at least one content item from a second content database, the provided content item being selected using the content selection criteria, wherein the provided content item is incorporated into the stages of AR content in real-time.

2. The method of claim 1, wherein the content items stored in the first content database comprise AR source content; and the content item in the second content database comprises non-AR raw data, AR source content, AR user content, or AR combined content, the AR combined content comprising AR source content and AR user content.

3. The method of claim 1, wherein a stage in the AR source content further comprises;
   virtual environment processing info;
   virtual object(s) processing info;
   interactive control information including AR process controls programmed to occur in response to physical actions of one or more users, wherein the AR process controls are pre-defined, real-time learned, or some combination;
   user info, including user identification, user biometrics, user behavioral information, user AR interactive information, user expression information, user gaze tracking information, user social media information, or some combination;
   user authentication info;
   connected device info, including connected device identification, connected device user association, connected device AR interaction, connected device information, connected device location tracking, connected device browser history, or some combination;
   business info, including user recent purchase history, user advertisement engagement, advertisement performance, AR advertisement bidding, AR advertisement ROI, AR advertisement budgeting, socioeconomic information, or some combination;
   real-life environment info, including pedestrian counting, crowd engagement, aggregated user information, aggregated device information, aggregated social media information, proximity information, or some combination; or
   some combination.

4. The method of claim 2, wherein different AR user content is generated for different user interactions with the same AR source content.

5. The method of claim 1, wherein the stages of the AR source content are independently modifiable so while running the current stage, all other stages can be updated without affecting the operation of the current stage of the AR source content.

6. The method of claim 1, wherein the content items incorporated into the stages of AR source content comprises AR combined content comprising one or more stages of user generated AR source content created from unique user interactions with the AR source content.

7. The method of claim 6, further comprising: receiving user generated AR source content and updating one or more stages of AR source content with the new user generated AR source content.

8. The method of claim 7, wherein the user generated AR source content is generated and incorporated into one or more stages of AR source content to provide live user interaction with an AR environment.

9. The method of claim 1, wherein the content selection criteria comprises user preferences, user information, user identification, user behavior, user bio-information, user AR interaction, user facial expressions, user physical movements, user gaze direction, user gaze duration, user connected device information, user connected device interaction, user dress, user social media data, user recent purchase history, user social-economic status analytics, pedestrian counting, aggregated data analytics, people counting, location information analytics, or other analytics information.

10. The method of claim 1, further comprising restricting access to at least one item of the AR source content or the content database(s), according to at least one authentication criterion.

11. The method of claim 10, wherein the authentication criteria comprises: admin access information, user access information, user sharing preferences, user privacy preferences, organization access information, organization sharing preferences, organization privacy preferences, online access information, or offline access information.

12. A content management system comprising;
    one or more processors; and
    a memory accessible to the one or more processors, the memory storing instructions executable by the one or more processors to:
    receive augmented reality (AR) source content in a first content database, the AR source content having a plurality of stages, wherein a first stage in the AR source content comprises:
    user image processing info in this stage, comprising an integration instruction to incorporate the user(s) image into an AR user content in real-time in this stage, wherein the user(s) image is extracted in real-life in real-time, and
    at least one transition criterion from this stage to another stage based on a user's behavior detected from real-time user image; and
    a second stage in the AR source content comprises user advertisement engagement info;
    store at least concurrent stage of AR source content;
    analyze at least one content item in the concurrent stage of AR source content to extract content selection criteria; and
    provide at least one content item from a second content database, the provided content item selected using the content selection criteria, wherein the provided content items are incorporated into the current stage of AR content in real-time.

13. The content management system of claim 12, wherein the stages of the AR source content are independently modifiable so that while running the current stage, all other stages can be updated without affecting the operation of the current stage of the AR source content.

14. The content management system of claim 12, wherein the content items in the first content database comprises AR source content; and the content items in the second content database comprises non-AR raw data, AR source content, AR user content, or AR combined content, the AR combined content comprising AR source content and AR user content.

15. The content management system of claim 12, further comprising restricting access to at least one item of the AR source content or the content database(s), according to at least one authentication criterion.

16. An apparatus for content management comprising:
    memory for storing a content management application and at least one stage of AR source content, the content management application programmed to manage AR content, wherein a first stage in the AR source content comprises:
    user image processing info in this stage, comprising an integration instruction to incorporate the user(s) image into an AR user content in real-time in this stage, wherein the user(s) image is extracted in real-life in real-time, and
    at least one transition criterion from this stage to another stage based on a user's behavior detected from real-time user image; and a second stage in the AR source content comprises user advertisement engagement info;

processors for:

receiving augmented reality (AR) source content in a first content database, the AR source content having a plurality of stages;

analyzing at least one content item in the concurrent stage of AR source content to extract content selection criteria; and provide at least one content item from a second content database, the provided content item selected using the content selection criteria, wherein the provided content items are incorporated into the current stage of AR content in real-time.

17. The apparatus of claim 16, wherein the stages of the AR source content are independently modifiable so that while running the current stage, all other stages can be updated without affecting the operation of the current stage of the AR source content.

18. The apparatus of claim 16, wherein the content selection criteria comprises user preferences, user information, user identification, user behavior, user bio-information, user AR interaction, user facial expressions, user physical movements, user gaze direction, user gaze duration, user connected device information, user connected device interaction, user dress, user social media data, user recent purchase history, user social-economic status analytics, pedestrian counting, aggregated data analytics, people counting, location information analytics, or other analytics information.

19. The apparatus of claim 16, wherein different AR user content is generated for different user interactions with the same AR source content.

20. The apparatus of claim 16, wherein the content items stored in the first content database comprise AR source content; and the content item in the second content database comprises non-AR raw data, AR source content, AR user content, or AR combined content, the AR combined content comprising AR source content and AR user content.

* * * * *